Patented July 20, 1943

2,324,639

UNITED STATES PATENT OFFICE 2,324,639

METHOD OF UTILIZING GRAPES AND PRODUCT PRODUCED THEREBY

Antonio Perelli-Minetti, Delano, Calif.

No Drawing. Application June 2, 1941,
Serial No. 396,283

6 Claims. (Cl. 99—105)

This invention pertains to methods of utilizing grapes and to the production of palatable food stuffs therefrom. More specifically, the present invention is directed to methods of producing grape syrups which distinguish from previously made grape syrups in that they contain the naturally occurring content of mineral salts but are free from the highly undesirable astringency and tartness which characterizes the prior natural products.

Tremendous quantities of grapes are raised along the Pacific coast and in certain sections in the eastern part of the United States. The acreage now in grapes greatly exceeds that necessary to fulfil the requirements of the wine industry, the fresh fruit trade and the dried fruit trade, so that during recent years, thousands of tons of grapes either rotted on the vines or constituted a disposal problem. It is an object of the present invention to disclose a method of utilizing large quantities of grapes in the preparation of a palatable food stuff.

Grapes constitute an important and valuable food. They have a fair content of vitamins A, B and C, and on the average, will contain about 20% carbohydrates, about 1.5% of fat, about 1.3% protein, important quantities of necessary salts of calcium, phosphorus and the like, and various yeasts, ferments and vitamins which have desirable but not well defined effects. Ordinary grape juice will contain about 20%–25% of readily assimilable sugars. Only a limited proportion of grapes is disposed of in the form of fresh fruit or in the form of grape juice.

Attempts have been made heretofore to produce a palatable grape syrup with little success. When grape juice is concentrated, the resulting syrup is found to be undesirably astringent so that it is not palatable. This is apparently due to the relatively high content of organic acids, mineral salts and tannin. Attempts have been made to overcome this difficulty by neutralizing the syrup with lime (and other chemicals) and by removing from the syrup insoluble lime compounds of the organic acids, but such treatment does not eliminate tannins and this procedure imparts undesirable off-flavors to the syrup, in most instances, alters or destroys the natural coloring and removes many constituents such as mineral salts which are beneficial to health.

I have discovered a method of producing grape syrup in which the aroma, bouquet and flavor of the grape and naturally present minerals and constituents are retained and a palatable fruit product is produced without the necessity of employing lime or other foreign agent for neutralization and without removing natural mineral constituents. The process of the present invention retains within the resulting food stuff all of the mineral content of the original syrup.

Furthermore, the product is not as astringent, does not cause puckering of the mouth lining and has good keeping qualities. The process of this invention is of accentuated sweetness, which sweetness is not noticeable in grape syrups heretofore produced.

Generally stated, the method of the present invention comprises crushing the grapes, subjecting the crushed and mashed grapes to a relatively coarse filtration and then concentrating the juice under a high vacuum to about 65°–72° Brix and then introducing into this concentrated syrup a relatively small quantity of butter fat, preferably in the form of dairy cream. When the butter fat has been homogeneously dispersed throughout the syrup it will be found that the resulting product is palatable and does not exhibit the astringent properties which it had originally, has an enhanced sweetness, and will granulate or crystallize upon standing only under extraordinary circumstances.

It is an object of the present invention, therefore, to disclose and provide a method of producing an improved grape product.

A further object is to disclose and provide a method of producing a grape syrup which is palatable, and which is not astringent nor tart.

Other objects, uses, advantages, modifications and adaptations of the invention will become apparent to those skilled in the art from the following description.

The process of the present invention may be applied to various types of grapes. Since grapes vary in color, flavor, sugar content, acid content, mineral content, degree of maturity, freshness, etc., minor changes in pressure may be availed of. In order to produce the product of this invention in its preferred form, the grapes should be fully mature in order to insure the presence of maximum sugar content and optimum flavor. However, this is not a requirement but an expression of preference.

The grapes should be crushed or mashed in any suitable manner and the resulting juice (carrying quantities of fiber, stems, pits, etc.) may be subjected to a screening operation or coarse filtration for the purpose of removing the major portion of the large insoluble solids such as stems, pits and large portions of skin. The resulting juice (in many instances containing some suspended solids) is then subjected to evaporation in a concentrating pan under a relatively high vacuum, such as for example, a vacuum above about 28 inches. The use of iron, tin or zinc should be avoided, the use of glass lined or stainless steel equipment being indicated. Concentration is carried out until the resulting syrup is above about 65° Brix and preferably above about 70° Brix.

Syrups at this stage of the process will be unpalatable because of the high content of organic acids. Moreover, even though such syrups contain large proportions of invert sugars, sucrose is also present (because the syrup is not fermented) and upon standing, some of the sugar has a tendency to crystallize out (at higher concentrations), rendering the product unsatisfactory for sale because of its unsatisfactory appearance and more difficult to use.

In accordance with the present invention, butter fat is dispersed throughout the syrup. Although previously separated butter fat may be used, I prefer to employ dairy cream, since this contains butter fat in a sufficiently fine form of division to render the incorporation of the fat into the syrup a simple matter of mixing the two components together. When dairy cream is employed, its butter fat content should be above about 10%. With the use of dairy cream I have found that satisfactory products are obtained by mixing from about 0.2 to 10 parts of dairy cream with 20 parts by volume of syrup. Ordinarily one to two parts of cream to twenty parts of syrup is all that is required. The mixing of these two ingredients may be accomplished by pumping and recirculating or by means of agitators in a tank. When butter fat in pure or more concentrated form is used, the proportions may be from 0.1 to 5 parts thereof to 20 parts of the syrup.

When some of the other forms of butter fat or bland vegetable oils are employed, it may be desirable to send the mixture through a homogenizer or subject the ingredients to a very thorough agitation in order to emulsify the butter fat or oil homogeneously throughout the syrup.

The resulting product may be pasteurized or it may be bottled or canned for distribution and sale. It will be found that the resulting product is dietetically useful and highly palatable. In the event the original grapes had a high mineral content, the product may have a very slight laxative property. It will be found that the resulting food stuff is sweet and eminently suited for use as a table syrup (particularly when smaller quantities of fat are emulsified therein), the food product appearing to be appreciably sweeter than the untreated syrup from which it is made. This intensified sweetness is apparently due to the fact that the acid and puckery constituents and properties of the original syrup are masked or rendered inactive by the emulsified and dispersed fat.

It will be noted that the resulting food stuff does not contain added organic ingredients such as lime and is composed of pure, wholesome, approved food stuff components.

I claim:

1. A palatable, unfermented food stuff comprising: grape syrup substantially free from added lime and containing naturally occurring mineral salts and organic acids, said syrup also containing dairy cream homogeneously dispersed therein in quantities sufficient to mask the acid content of the syrup and permit its use as a food stuff without causing puckering.

2. A palatable food stuff comprising: grape syrup substantially free from added lime, said syrup containing from 0.1 to 5 parts of butter fat homogeneously emulsified in 20 parts of said syrup.

3. A palatable, unfermented food stuff comprising: grape syrup substantially free from added lime, said syrup containing from 0.2 to 10 parts of dairy cream homogeneously emulsified in 20 parts of said syrup.

4. A palatable food stuff comprising: grape syrup substantially free from added lime and with from 0.2 to 10 parts of dairy cream homogeneously emulsified therein, said food stuff containing naturally occurring mineral salts and organic acids derived from grape syrup and being characterized by non-astringent properties.

5. In a method of producing a palatable food stuff from grapes: producing grape syrup of above 65° Brix and then dispersing a butter fat therein in the proportion of from 0.1 to 5 parts of such fat per 20 parts of syrup.

6. In a method of producing a palatable food stuff from grapes: producing grape syrup of above 65° Brix and then dispersing dairy cream therein in the proportion of from 0.2 to 10 parts of dairy cream per 20 parts of syrup whereby the resulting product is of enhanced sweetness and is characterized by non-astringent properties.

ANTONIO PERELLI-MINETTI.